United States Patent
Preis et al.

(10) Patent No.: US 7,353,527 B2
(45) Date of Patent: Apr. 1, 2008

(54) HOLDING APPARATUS FOR A STORAGE MEDIUM

(75) Inventors: Karl-Heinz Preis, Heidenheim (DE); Ulrich Zech, Munich (DE); Ingo Kolsch, Schoenaich (DE)

(73) Assignee: Intergraph Hardware Technologies, Co., Las Vegas, NV (US)

( * ) Notice: Subject to any disclaimer, the term of this patent is extended or adjusted under 35 U.S.C. 154(b) by 439 days.

(21) Appl. No.: 11/084,558

(22) Filed: Mar. 18, 2005

(65) Prior Publication Data

US 2005/0240950 A1    Oct. 27, 2005

(30) Foreign Application Priority Data

Mar. 20, 2004    (DE)    ............ 10 2004 013 876

(51) Int. Cl.
*G11B 33/13*    (2006.01)
(52) U.S. Cl. .................... 720/651
(58) Field of Classification Search ......... 720/651; 360/97.01, 97.04
See application file for complete search history.

(56) References Cited

U.S. PATENT DOCUMENTS

| | | | | |
|---|---|---|---|---|
| 4,831,476 A | * | 5/1989 | Branc et al. | 360/97.02 |
| 4,937,806 A | * | 6/1990 | Babson et al. | 720/651 |
| 5,953,303 A | * | 9/1999 | Sugano et al. | 720/651 |
| 6,289,678 B1 | | 9/2001 | Pandolfi | |
| 6,320,744 B1 | | 11/2001 | Sullivan et al. | |
| 6,560,064 B1 | | 5/2003 | Hirano | |
| 2003/0048743 A1 | * | 3/2003 | Guion et al. | 369/263 |
| 2003/0218867 A1 | | 11/2003 | Sawyer et al. | |
| 2006/0064711 A1 | * | 3/2006 | Chang | 720/651 |

* cited by examiner

*Primary Examiner*—Allen Cao
(74) *Attorney, Agent, or Firm*—GrayRobinson, PA

(57) ABSTRACT

A holding apparatus for at least one storage medium has a housing in which a supporting structure is arranged. The supporting structure is in this case connected to the housing with vibration damping via a damping device. A storage medium is arranged in the supporting structure. The storage medium is bounded in a pressuretight manner from an external atmosphere. A cooling element is provided for cooling the storage medium.

20 Claims, 3 Drawing Sheets

HOLDING APPARATUS FOR A STORAGE MEDIUM

BACKGROUND OF THE INVENTION

1. Field of the Invention

The invention relates to a holding apparatus for at least one storage medium.

2. Description of the Related Art

An apparatus for the arrangement of a storage medium, for example a bulk store in the form of a hard disk, is known from the general prior art, in which the storage medium is introduced into a holder which is connected to a housing. Impacts, vibration and oscillations in this case generally do not disturb the storage medium provided that the hard disk head which is provided for reading from or writing to the storage medium is in a park position. As soon as the hard disk head is used for reading or writing, however, vibration, oscillations and/or impacts can lead to damage or to destruction of the storage medium. Impacts, oscillations and vibration may have different causes and may occur in very widely different applications. Normally, loads such as these can be expected in this case when the storage medium is used in land vehicles, watercraft or aircraft, in which information must be written to the storage medium or read from the storage medium while they are in motion.

In order to also make it possible to read data from the storage medium, or to write to it, in rugged environmental conditions such as these, correspondingly expensive special hard disks are known which can admittedly at least partially tolerate such impacts, oscillations and vibration, but which allow only low data transmission rates. One disadvantage in this case is that the simple and low-price hard disks which are available as standard products with an appropriate transmission rate on the market can thus not be used, so that the costs are increased by many times.

In particular, special hard disks such as these are also used when the storage medium is a flight data recorder on which the aim is to store large amounts of data from a digital camera during a photographic flight. This data may, for example, be image data, supplementary data relating to the images, such as mission data, system information, or general information for post-processing. The storage medium is in this case generally a bulk memory for "digital mapping camera".

Every storage unit is mechanically secured in the aircraft and is electrically connected to all the necessary cables. Electrically and mechanically, every flight data recorder is an autonomous unit which is connected to a digital camera via an image data connection. Furthermore, a monitoring data input, a monitoring data output and a supply voltage input, a supply voltage output and a serial connection are provided for configuration.

The flight data recorder stores the image data during the flight. After landing, the flight data recorder is removed, and the image data is copied to a ground-based bulk memory. After the copying process and subsequent formatting, the flight data recorder is free for further photographic flights again.

However, one disadvantage in this case of the use of a storage medium as a flight data recorder is that the pressure surrounding the storage medium falls as the altitude increases, thus possibly resulting in a pressure which is below the minimum permissible pressure that is required for the storage medium to operate correctly.

Already known apparatuses for holding a storage medium are also subject to the problem that the amount of heat developed from the hard disk cannot reliably be dissipated.

The problems described with respect to use as a flight data recorder occur not only in this field but also in other fields in which the storage medium is used in a rugged environment. By way of example, applications may be mentioned in this context in the military field, in the industrial field or for in-field applications.

SUMMARY OF THE INVENTION

The present invention is thus based on the object of providing a holding apparatus for at least one storage medium, which solves the abovementioned disadvantages of the prior art, and in which the storage medium is protected in particular against vibration and impacts, as well as pressure fluctuations and excess heat development.

According to the invention, this object is achieved in that the storage medium is arranged in a supporting structure which is connected to a housing, which surrounds the supporting structure, with vibration damping via a damping device, with the storage medium being bounded in a pressuretight manner from an external atmosphere, and with a cooling element being provided for cooling the storage medium.

The arrangement of the storage medium according to the invention protects it against vibration, oscillations and impacts. The storage medium can thus be a relatively simple and low-cost standard hard disk. There is therefore no need for specific, and thus cost-effective, special manufacture of the hard disk and/or of the hard disk head which is used for writing and/or reading. Since the storage medium is provided with vibration damping via a supporting structure, the storage medium can be replaced simply without having to remove the entire damping device. The damping device and the supporting structure can also remain unchanged when the storage medium is changed, or when it is replaced for repair or as a result of capacity In this case, it is advantageous for the damping device to be designed dynamically.

Numerical calculations and experiments have shown that a refinement of the damping device with two or more vibration isolators, which are preferably in the form of commercially available wire cable vibration dampers, are particularly suitable for damping and for absorption of the impacts and vibration that occur.

Since the storage medium, according to the invention, is bounded in a pressuretight manner from an external atmosphere, this prevents the pressure in the area of the storage medium from falling whenever the altitude changes, for example when used in an aircraft, thus possibly resulting in a pressure which no longer allows the storage medium to operate correctly.

Furthermore, this prevents moisture from being able to accumulate in the supporting structure which, at appropriately low temperatures, could lead to an increase in the relative humidity which is unacceptable for operation of the storage medium.

The solution according to the invention likewise solves the problem which regularly occurs during use of a storage medium of cooling and dissipation of the heat that is produced by use of the storage medium. A cooling element is used for this purpose, which cools the storage medium which is bounded in a pressuretight manner from an external atmosphere. If the storage medium is arranged such that it is sealed in a pressuretight manner from the external atmosphere, its cooling is particularly important since, otherwise, it is not reliably possible to preclude overheating and thus damage to the storage medium.

The apparatus according to the invention can also be used to hold two or more storage media. For this purpose, for example, two or more hard disk drives can be mechanically and electrically combined to form an easily replaceable unit, and can be arranged in a supporting structure. Alternatively, it is also possible to arrange two or more supporting structures within one housing.

It is advantageous for the supporting structure likewise to be used for holding electrical system components, such as a power supply unit, interfaces, controllers or raid controllers, etc. In experiments, it has been found that an arrangement that is protected against vibration and impacts is also advantageous for these electronic system components.

The apparatus according to the invention is particularly suitable for storage of image data and further data when the storage medium is used as a component of a flight data recorder in an aircraft. It is advantageous for the housing within which the supporting structure together with the storage medium is arranged to have means for attachment to an adapter which is connected to an aircraft.

An embodiment of the housing for attachment to an adapter has been found to be particularly suitable in order to allow the apparatus according to the invention to be used in a simple manner in different aircraft types. In this case, the adapter can be firmly connected to the aircraft, so that the apparatus and the housing according to the invention are provided with appropriate guidance. In this case, there is no need to arrange the housing such that it is impact-resistant and is protected against vibration, since the impacts, oscillations and vibration which occur are absorbed by the damping device between the supporting structure and the housing. In this case, it is advantageous for the housing to have coupling elements, which can be connected to coupling elements of the adapter in order to transmit and/or receive signals and/or a supply voltage.

This results in electrical contact being made in a particularly simple and advantageous manner between the storage medium or further system modules which are located within the housing and a cable connection which, for example, leads to a digital camera or to a vehicle power supply system. In this case, it is advantageous for the electrical contact with the cable connections that have been mentioned to be made at the same time by the mechanical fixing of the housing in the adapter. It is also advantageous for the damping device to also compensate for or absorb impacts which result from the housing being introduced into the adapter.

Numerical calculations and experiments have shown that it is particularly appropriate for the supporting structure in which the storage medium is designed to be pressuretight.

This can be achieved, for example, by the supporting structure being a pressure-resistant or pressuretight housing. The storage medium is thus encapsulated in a simple form in a pressuretight manner and is thus independent of pressure fluctuations which occur, for example, when the altitude of an aircraft changes.

In a refinement of the invention, it is in this case possible to provide for the supporting structure to have means which allow it to be open to a defined extent in order (when the pressure level of the external atmosphere is higher than that in the interior of the supporting structure) to allow air to flow into the supporting structure since, in principle, it is not possible to preclude a certain amount of pressure loss between the supporting structure and the external atmosphere despite the supporting structure being designed to be pressuretight. From experience, when used at high altitudes, more air flows out of the supporting structure per unit time than flows back in the phase on the ground, because the pressure differences are different. An excessively low internal pressure can in this case be counteracted by a defined opening of the supporting structure.

Desiccant cartridges which are known from the general prior art can be used in order to avoid moisture, which may be transported from the outside to the inside during a gas exchange, adversely affecting the storage medium.

In a pressuretight refinement of the supporting structure, it is possible to provide for the controller to be arranged on the outside of the supporting structure.

In principle, the controller as well as further system components can also be arranged within the pressuretight supporting structure. However, this is worthwhile only for those system components which require pressure stability or for which this has a significant advantageous effect.

Furthermore, in one design refinement of the invention, it is possible to provide for thermally conductive elements to be arranged between the inside of the supporting structure and the storage medium. The heat which is produced by the storage medium is dissipated quickly and reliably to the supporting structure, in a simple manner, by means of the thermally conductive elements. The thermally conductive elements may in this case, for example, be conductive mats.

It is advantageous for the outside of the supporting structure to be provided with cooling ribs.

Experiments have shown that a refinement of the supporting structure with cooling ribs results in particularly advantageous dissipation of the heat from the supporting structure to the external atmosphere.

It is advantageous for the cooling element to be arranged or inserted in such a way that the cooling element is used mainly for cooling the outside of the supporting structure and/or of the controller and/or of further system components. In this case, it is possible for the cooling element to be a fan which introduces or sucks air from outside the housing into the housing. The housing may in this case have air aperture openings for convection with the external atmosphere. In this case, it has also been found to be advantageous to use air guide plates which surround the supporting structure and/or the controller and/or further system components, and which allow the air flow produced by the fan to deliberately flow past them.

In order to control the air flow, it has also been found to be advantageous to provide a baffle cloth between the fan and the supporting structure, and/or the controller and/or further system components. The baffle cloth may in this case, for example, be a textile baffle cloth and prevents the fan from feeding the air flow into areas where it is not effective. The baffle cloth allows the air flow to be passed deliberately to those areas from which heat dissipation is necessary.

As an alternative to the pressuretight embodiment of the supporting structure, it is also possible to provide in one design refinement of the invention for the housing to be pressuretight. The supporting structure may in this case be designed so as to allow circulation of the gaseous medium (for example air) enclosed in the housing around the storage medium. This is an embodiment which may appear to be advantageous for certain applications.

In general, however, experiments have shown that a pressuretight configuration of the supporting structure whose interior is matched as well as possible to the storage medium to be accommodated is particularly suitable. The pressuretight embodiment of the housing has the disadvantage that it is not possible to use cool external air for direct cooling of the elements which generate heat. The system components which are contained in the pressuretight housing can be cooled only purely passively by emitting the heat to the pressuretight housing and then dissipating the heat from the pressuretight housing to the external environment. In this case, cooling can be improved by arranging a cooling element, for example a fan, within the pressuretight housing. The cooling element may in this case be used for circulation of the gaseous medium within the pressuretight housing, thus improving the heat dissipation to the housing. A baffle cloth, preferably a textile baffle cloth, may in this case be used to control the circulation of the gaseous medium, so that the heat-generating system components, preferably the storage medium, are essentially cooled by the fan within the pressuretight housing.

Advantageous refinements and developments of the invention can be found in the other dependent claims.

Exemplary embodiments of the invention will be described, in principle, in the following text with reference to the drawings.

DETAILED DESCRIPTION

Figure 1:
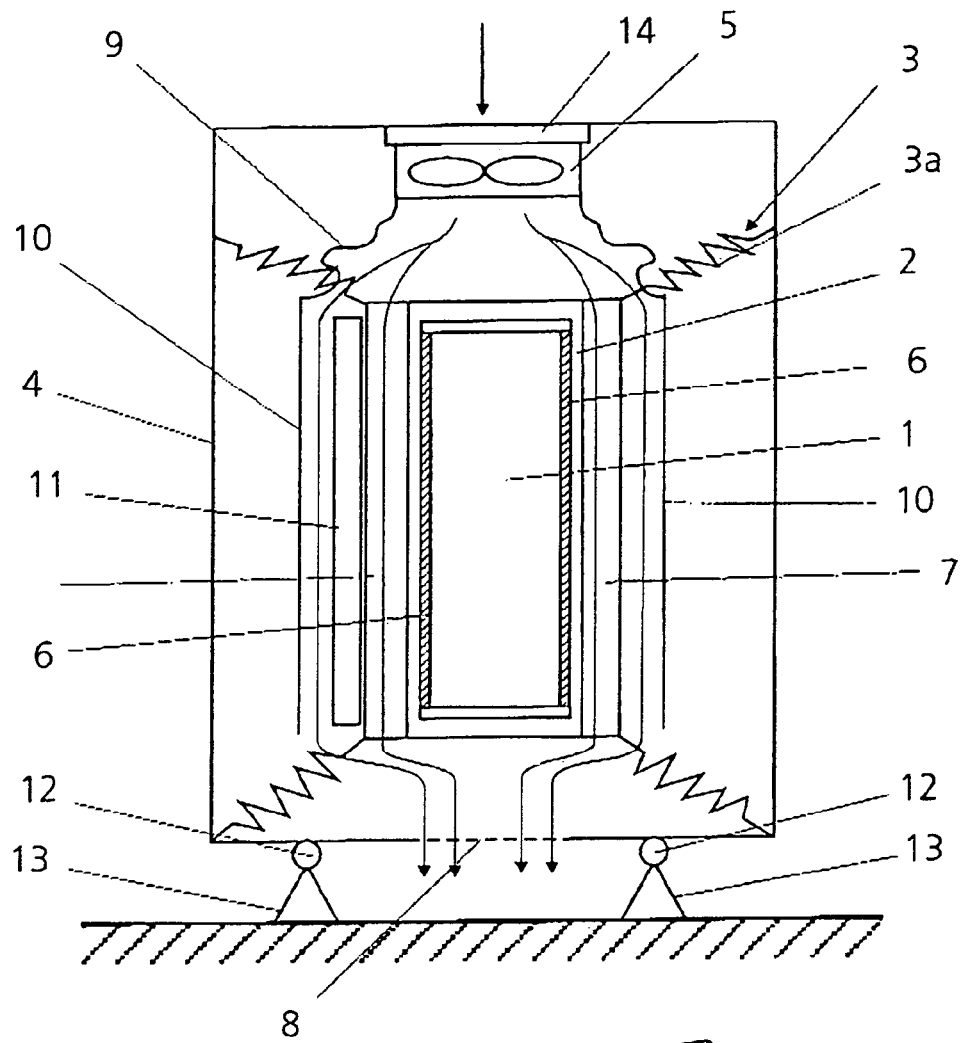
FIG. 1 shows an outline illustration of the apparatus according to the invention with a storage element which is arranged within a pressuretight supporting structure.

FIG. 1 shows the holding apparatus according to the invention for at least one storage medium 1. In this case, the exemplary embodiment provides for the storage medium 1 to be a hard disk store. The hard disk store is in this case used to store the data obtained from a digital camera during the photographic flight. Digital cameras for recording data such as this have been known for a long time from the general prior art, and they will therefore not be described in any more detail in the exemplary embodiment. In principle, the apparatus according to the invention is suitable for use in widely differing fields in which it is necessary to reliably write and read data to and from a storage medium. The apparatus according to the invention is in this case particularly preferably suitable for use in fields of technology in which the storage medium is subject to impacts, vibration, oscillations and/or pressure fluctuations while being read from or written to.

By way of example, the exemplary embodiment shows the application of a flight data recorder which is used for recording image data in an aircraft.

Since some of the elements contained in the exemplary embodiment have already been known for a long time from the general prior art, only those features which are significant to the invention will be described in more detail in the following text.

In the exemplary embodiment, the storage medium is a commercially available hard disk 1.

As can be seen from FIG. 1, the hard disk 1 is arranged in a supporting structure 2 which is connected to a housing 4 surrounding the supporting structure 2, with vibration damping via a damping device 3. The hard disk 1 is in this case bounded in a pressuretight manner from an external atmosphere, which is not illustrated in any more detail. A cooling element 5 is provided for cooling the hard disk. The pressuretight or pressure-isolated arrangement of the hard disk 1 as shown in FIG. 1 is provided by the supporting structure 2 being pressuretight. In this case, the supporting structure 2 has an internal area which essentially corresponds to the dimensions of the hard disk 1. In this case, provision is made for thermally conductive elements 6 to be arranged between the inside of the supporting structure 2 and the hard disk 1. In FIG. 1, the thermally conductive elements are in this case conductive mats 6. The temperature which results during operation of the hard disk 1 is thus transported away quickly and reliably via the conductive mats 6, and is passed into the supporting structure 2. The absorbed heat is radiated to the exterior from the supporting structure 2. In order to assist the process of rapidly transporting heat away from the surface of the supporting structure 2, the supporting structure 2 has cooling ribs 7 on its outside, which correspondingly enlarge the surface area.

In FIG. 1, the cooling element 5 is intended essentially to cool the outside of the supporting structure 2. The cooling element is in this case a fan 5 which is attached to the housing 4. The fan 5 draws its air as required for ventilation from the external atmosphere outside the housing 4. The induced air is passed or ventilated from the fan 5 in the direction of the supporting structure 2, so that the air flows past the largest possible surface area of the supporting structure 2. For convention with the external atmosphere, the housing 4 has air aperture openings 8 in addition to the inlet opening for the fan 5. A textile baffle cloth 9 is provided in order to control the air flow between the fan 5 and the supporting structure 2. The textile baffle cloth 9 is in this case stretched in such a way that the supporting structure 2 is located in the middle of the air flow produced by the fan 5. In addition to the textile baffle cloth 9, the exemplary embodiment illustrated in FIG. 1 also has guide plates 10 which are likewise intended to pass the air flow 2 produced by the fan 5 over the supporting structure 2 in an appropriately channelized form. In this case, as is shown in FIG. 1, the textile baffle cloth 9 is stretched between the fan 5 and the guide plates 10.

The guide plates 10 may rest on the cooling ribs 7 on the supporting structure 2 or may be adjacent to them, so that the guide plates 10 and the cooling ribs 7 create channels through which the air produced by the fan 5 can flow in order to cool the outside of the supporting structure 2.

As can be seen from FIG. 1, a controller 11 is arranged on the outside of the supporting structure 2. In addition to the controller 11, further system components may also be arranged on the outside of the supporting structure 2, in a manner which is not illustrated in any more detail. The system components may also be arranged in the pressuretight interior of the supporting structure 2 if this appears to be advantageous for its functionality.

As can also be seen from FIG. 1, the fan 5 is aligned in such a way that the controller 11 is also cooled, in addition to the outside of the supporting structure 2. The controller 11 is thus arranged within a large air channel that is bounded by the guide plates 10. FIG. 1 shows the principle of one possible path for the air flow.

Figure 5:
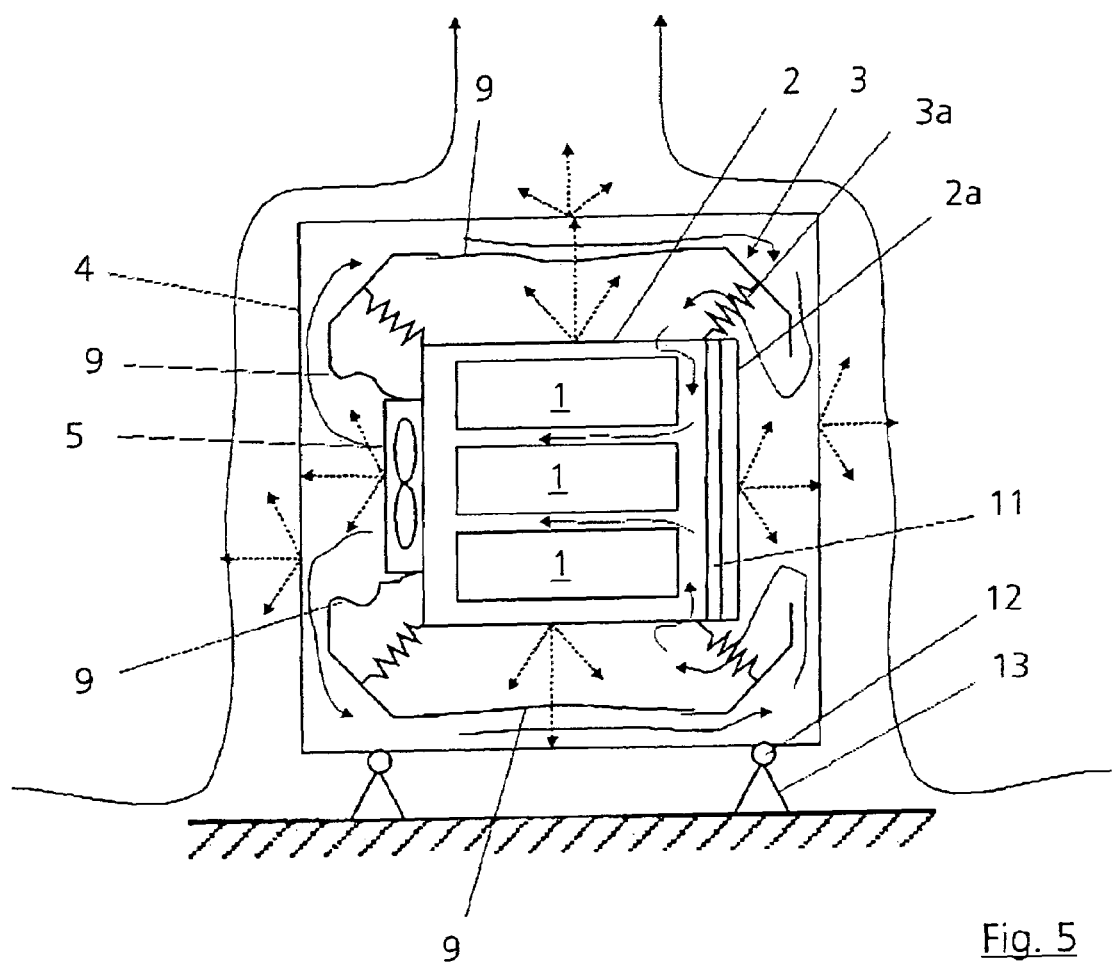
FIG. 5 shows an alternative refinement for the solution according to the invention to that illustrated in FIG. 1, with the housing being pressuretight.

As can be seen from FIG. 1 and FIG. 5, the damping device 3 has two or more vibration isolators 3a. In the illustrated exemplary embodiment, the vibration isolators are in this case commercially available wire cable vibration dampers 3a. These wire cable vibration dampers 3a are in this case arranged such that the hard disk 1 or the supporting structure 2 is suspended within the housing 4.

As can also be seen from FIG. 1, the housing 4 has means 12 for attachment to an adapter 13 which is connected to an aircraft. In this case, the invention also provides, in a manner which is not illustrated in any more detail, for the housing 4 to have coupling elements which can be connected to coupling elements on the adapter 13 in order to transmit/to receive signals and/or a supply voltage.

In FIG. 1, the fan 5 has an air filter 14 in order to clean the induced air.

Figure 2:
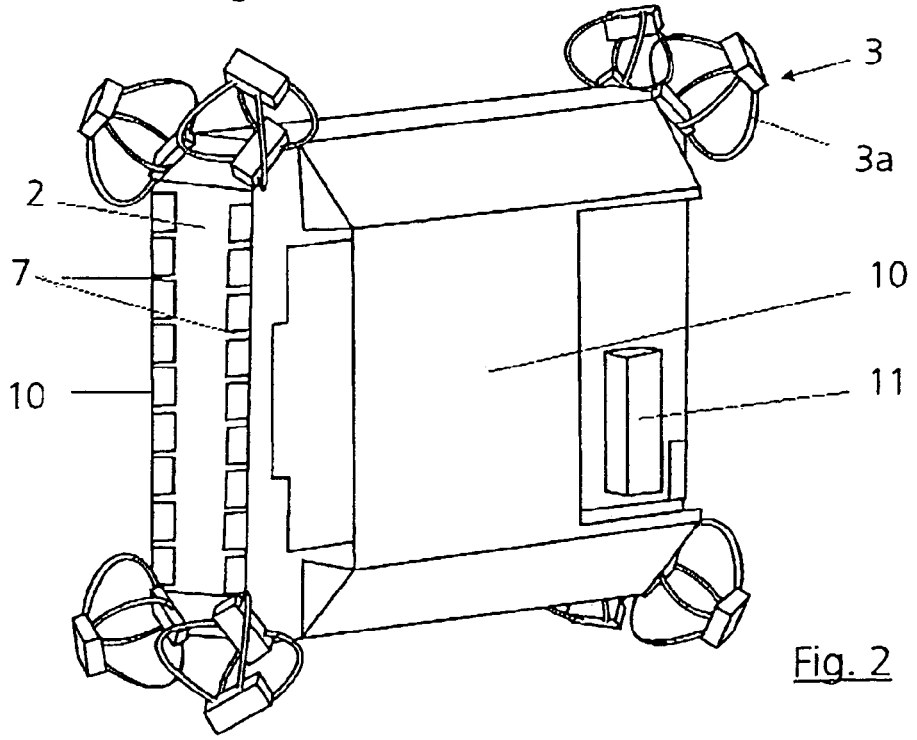
FIG. 2 shows a perspective illustration of the supporting structure with a controller attached to the outside, air guide plates and a damping device for attachment to a housing which is not illustrated.

FIG. 2 shows an illustration in which the supporting structure 2 is provided on its outside with eight wire cable vibration dampers 3a in order to connect it to a housing 4, which is not illustrated in FIG. 2, with oscillation and vibration damping. In this case, the controller 11 is arranged on one outer face of the supporting structure 2. As already illustrated fundamentally in FIG. 1, the supporting structure 2 has cooling ribs 7. The supporting structure 2 as well as the controller 11 are surrounded by two guide plates 10 so that, in conjunction with the cooling ribs 7, corresponding cooling channels are formed through which the air produced by the fan 5 can flow (not shown in FIG. 2).

Figure 3:
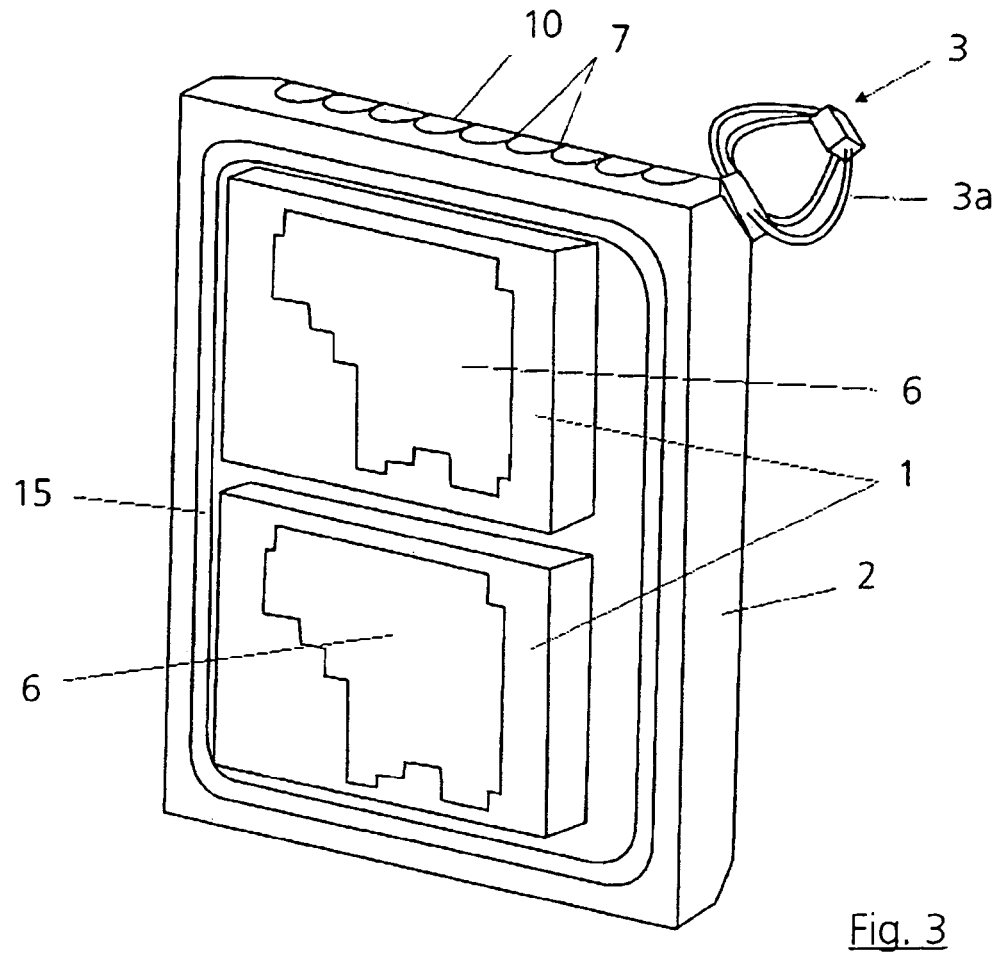
FIG. 3 shows an internal view of the supporting structure with two storage media in the form of hard disks.

FIG. 3 shows a view of the supporting structure 2 shown in FIG. 2, with one half of the supporting structure 2 having been removed, so that the interior of the supporting structure 2 is shown, in principle. In the exemplary embodiment which is illustrated in FIG. 3, two hard disks 1 are in this case arranged in the interior of the supporting structure 2. The hard disks 1 are in this case arranged in such a way that the surface area of the hard disks 1 facing the outside of the supporting structure 2 that, is provided with the cooling ribs 7 is as large as possible. The already mentioned thermally conductive elements 6, in the form of conductive mats, are arranged between the hard disks 1 and the inside of the supporting structure 2.

The supporting structure 2 is essentially formed from two halves which can be connected to one another by two or more screws. The two halves of the supporting structure 2 are in this case essentially half shells. A seal 15 may be arranged between the two half shells of the supporting structure 2. This results in an adequately pressuretight supporting structure 2, in which the two hard disks 1 can be arranged.

Figure 4:
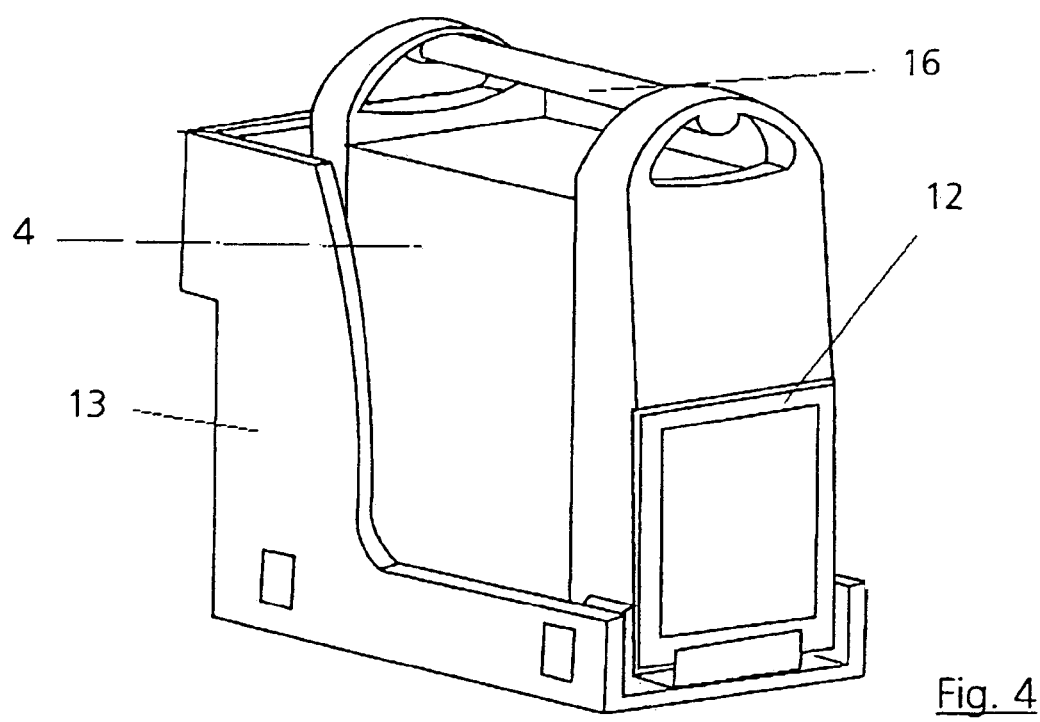
FIG. 4 shows a perspective illustration of an adapter in which a housing for the apparatus according to the invention is inserted.

FIG. 4 shows one possible refinement of the housing 4 and of the adapter 13. As shown in FIG. 4, the means 12 for connection of the housing 4 to the adapter 13 are formed by a lever 12 by means of which the housing 4 can be clamped in the adapter 13. If required, the lever 12 may in this case be supported by further attachment elements and/or locking elements. The housing is provided with an externally fitted handle 16 by means of which the housing 4 can be inserted into the adapter 13, and can be removed from it again, in a simple manner. A refinement such as this is particularly suitable for use of the apparatus according to the invention for holding image data in an aircraft, since apparatuses such as these have to be removed frequently in order to allow the hard disks 1 to be read.

FIG. 5 shows an alternative refinement to that shown in FIG. 1. The elements denoted by the same reference symbols in FIG. 1 and FIG. 5 have the same function and, with the exception of the following differences, are designed analogously and/or identically. In contrast to FIG. 1, the housing 4 in FIG. 5 is pressuretight.

In this case, the supporting structure 2 has a refinement which allows the gaseous medium (for example air) which is enclosed in the housing 4 to circulate around the hard disk 1. In this case, provision is likewise made for the other system elements which are arranged in the housing 4, for example the controller 11, to be cooled by the circulation of the gaseous medium which is enclosed in the housing 4. A cooling element 5 in the form of a fan is arranged in the housing 4. A textile baffle cloth 9 is provided within the housing 4, likewise analogously to FIG. 1, and is intended to control the circulation of the gaseous medium in such a way that, as far as possible, the flow passes around and cools all of those elements which are contained in the housing 4,—in particular the hard disk 1—which tend to develop heat.

As can be seen in FIG. 5, the fan 5 is arranged on the outside of the supporting structure 2 in such a way that the fan 5 actively sucks the gaseous medium from the interior of the supporting structure 2 in which the hard disks 1 are arranged. The textile baffle cloth 9 deflects the gaseous medium that is sucked out of the interior of the supporting structure 2 and passes it to an area of the supporting structure 2 opposite the fan 5. Appropriate openings in the supporting structure 2 and an open design of the supporting structure 2 allow the gaseous medium to flow into the interior of the supporting structure 2 once again in order to cool the hard disks 1. The arrows in FIG. 5 show one fundamentally possible and advantageous flow path. The baffle cloth 9 and fan 5 result in a constant flow of the gaseous medium through the interior of the supporting structure 2, and thus along with the hard disks 1. The fan 5, the system components (the hard disk 1, the controller 11, etc.) which are contained in the interior of the housing 4, as well as the flow path of the gaseous medium are arranged in such a way that the heat is introduced as intensely as possible into the housing 4. The heat is emitted from the housing 4 to the surrounding area, thus resulting in cooling.

The solution according to the invention is particularly suitable for pressure-isolated and vibration-damped attachment of storage media. However, in a development, other system elements in which such retention is advantageous may also be used rather than the storage media in the solution according to the invention.

What is claimed is:

1. A holding apparatus for at least one storage medium, wherein the storage medium is arranged in a supporting structure which is connected to a housing, which surrounds the supporting structure, with vibration damping via a damping device, with the storage medium being bounded in a pressure-tight manner from an external atmosphere, and with a cooling element being provided for cooling the storage medium.

2. The apparatus as claimed in claim 1, wherein a controller is arranged on the supporting structure.

3. The apparatus as claimed in claim 1, wherein the damping device has two or more vibration isolators.

4. The apparatus as claimed in claim 3, wherein the vibration isolators are wire cable vibration dampers.

5. The apparatus as claimed in claim 1, wherein the housing has means for attachment to an adapter which is connected to an aircraft.

6. The apparatus as claimed in claim 5, wherein the housing has coupling elements which is connected to coupling elements of the adapter in order to transmit/receive signals and/or a supply voltage.

7. The apparatus as claimed in claim 1, wherein the supporting structure in which the storage medium is arranged is pressure-tight.

8. The apparatus as claimed in claim 2, wherein the controller is arranged on the outside of the supporting structure.

9. The apparatus as claimed in claim 7, wherein thermally conductive elements are arranged between the inside of the supporting structure and the storage medium.

10. The apparatus as claimed in claim 9, wherein the thermally conductive elements are conductive mats.

11. The apparatus as claimed in claim 7, wherein the outside of the supporting structure is provided with cooling ribs.

12. The apparatus as claimed in claim 1, wherein the cooling element is used for cooling the outside of the supporting structure and/or of the controller and/or further system components.

13. The apparatus as claimed in claim 1, wherein the housing has air aperture openings for convection with the external atmosphere.

14. The apparatus as claimed in claim 1, wherein the cooling element is in the form of a fan which introduces air from outside the housing into the housing.

15. The apparatus as claimed in claim 14, wherein a baffle cloth is provided in order to control the air flow between the fan and the supporting structure.

16. The apparatus as claimed in claim 7, wherein the internal area which is formed by the supporting structure is essentially matched with the shape of the storage medium.

17. The apparatus as claimed in claim 1, wherein the housing is pressure-tight.

18. The apparatus as claimed in claim 17, wherein the supporting structure allows circulation of the gaseous medium which is enclosed in the housing around the storage medium.

19. The apparatus as claimed in claim 17, wherein the cooling element is arranged within the housing and is a fan.

20. The apparatus as claimed in claim 17, wherein a baffle cloth is provided in order to control the circulation of the gaseous medium.

* * * * *